United States Patent [19]

Kawashima

[11] Patent Number: 4,833,355
[45] Date of Patent: May 23, 1989

[54] MOTOR WITH ARMATURE TEETH AND FIELD MAGNET

[75] Inventor: Kinji Kawashima, Saitama, Japan

[73] Assignees: Sanyo Electric Co., Ltd.; Kumagaya Seimitsu Co., Ltd., both of Japan

[21] Appl. No.: 208,180

[22] Filed: Jun. 16, 1988

[30] Foreign Application Priority Data

Jun. 19, 1987 [JP] Japan .................................. 62-153778

[51] Int. Cl.⁴ .............................................. H02K 1/08
[52] U.S. Cl. .................................... 310/198; 310/154; 310/49 R
[58] Field of Search ...................... 310/49 R, 154, 179, 310/195, 198, 200

[56] References Cited

U.S. PATENT DOCUMENTS 4,095,161 6/1978 Heine et al. ........................ 310/49 R
4,692,646 9/1987 Gotou ................................. 310/198
4,700,098 10/1987 Kawashima .......................... 310/186

Primary Examiner—Patrick R. Salce
Assistant Examiner—Judson H. Jones
Attorney, Agent, or Firm—Darby & Darby

[57] ABSTRACT

A motor includes an armature and a field magnet which surrounds the armature. The armature includes a plurality of teeth being arranged at equal pitch, and the field magnet includes a plurality of magnetic poles being arranged at equal pitch. When the number of the magnetic poles of the field magnets is "2P" and the number of phases of divided armature windings is "Q", the number T of the teeth is determined in accordance with an equation $T=(P\pm N)Q$ ($0<N<N<P-2P/Q$). In addition, "phase" and "winding direction" of the divided armature windings to be wound on the respective teeth are determined through comparison of an actual angle in electrical degrees of respective one of teeth and an ideal angle in electrical degrees corresponding thereto.

7 Claims, 10 Drawing Sheets

PRIOR ART

F I G. 8
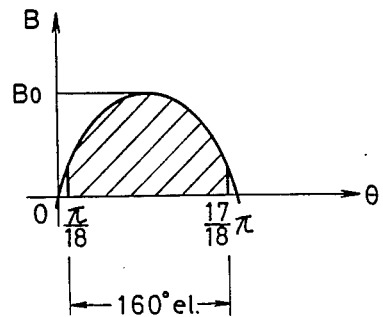
F I G. 10
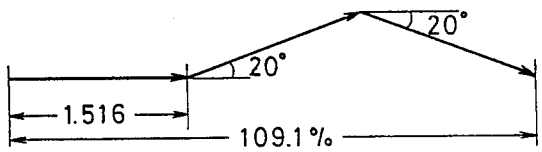

MOTOR WITH ARMATURE TEETH AND FIELD MAGNET

BACKGROUND OF THE INVENTION

1. Field of the invention

The present invention relates to a motor with armature teeth and a field magnet. More specifically, the present invention relates to a motor in which a rotational magnetic field is generated by applying voltages of respective phases that are different in phase from each other to divided armature windings wound on a plurality of teeth of an armature. This is done; so that a rotor, that is, the armature or the field magnet is rotated by means of magnetic interaction between the rotational magnetic field thus generated and the magnetic field of the field magnet.

2. Description of the prior art

One example of a conventional brushless motor is shown in FIG. 1. In this conventional brushless motor, a stator or armature 1 includes twelve teeth $2_1$-$2_{12}$ being formed in a radial manner, and divided windings $U_1$-$U_4$, $V_1$-$V_4$ and $W_1$-$W_4$ of U, V and W phases are wound on the respective teeth $2_1$-$2_{12}$ as armature windings 3. On the other hand, a rotor or field magnet 4 includes eight magnetic poles 5. Thus, in FIG. 1, a conventional brushless motor of three phases and eight poles is constructed. Then, when voltages of respective phases are applied to the divided armature windings $U_1$-$U_4$, $V_1$-$V_4$ and $W_1$-$W_4$ of the armature 1, respectively, a rotational magnetic field is generated by the divided armature windings $U_1$-$U_4$, $V_1$-$V_4$ and $W_1$-$W_4$, and the field magnet 4 is rotated by means of magnetic attracting force and magnetic repelling force being generated between the respective magnetic poles 5 of the field magnet 4 and such a rotational magnetic field.

Generally, it is well known that the number T of the teeth 2 of the armature 1 is given by the following equation (1) in association with the number 2P of the magnetic poles 5 of the field magnet and the number Q of the phases of the divided armature windings 3.

$$T = PQ \qquad (1)$$

In the conventional brushless motor as shown in FIG. 1, since P=4 and Q=3, the number T of the teeth becomes T=12.

In addition, as is well known, the number of coggings for each one rotation of the field magnet is equal to the least common multiple (LCM) of T and 2P, and the number of simultaneous coggings is equal to the greatest common measure denominator (GCD) thereof. Therefore, in the example as shown in FIG. 1, twenty-four times of coggings occur for each one rotation of the field magnet 4, and four-times of coggings occur simultaneously. Therefore, in the conventional brushless motor as shown in FIG. 1, combined cogging force becomes four-times of the cogging force for each magnetic pole of the field magnet 4, as shown in FIG. 2.

If such a large cogging force occurs, smooth rotation of the field magnet is prevented and vibration takes place. Therefore, the combined cogging force is to be made as small as possible. As a means for making the combined cogging force small, there is a method where magnetic force of each magnetic pole of the field magnet is weakened, or a distance between respective magnetic poles of the field magnet and the teeth of the armature is made larger. However, in any of these approaches, efficiency and output power of a motor is reduced.

Therefore, the inventor of the present invention has proposed a novel motor in which the combined cogging force becomes small in U.S. Pat. No. 4,700,098 (Oct. 13, 1987) which was assigned to one of assignees of the present invention, Sanyo Electric Co., Ltd.. In the motor disclosed in U.S. Pat. No. 4,700,098, the teeth of armature are arranged at unequal pitch so as to avoid coincidence in timing of coggings respectively generated by the respective magnetic poles of the field magnet, whereby the number of simultaneous coggings becomes "1" and the combined cogging force is made smaller than the conventional motor as shown in FIG. 1.

However, in the motor disclosed in U.S. Pat. No. 4,700,098, since the teeth are arranged at unequal pitch, width of respective slots between the adjacent teeth becomes uneven, therefore; there was a disadvantage that it is difficult to wind the divided armature windings. Such disadvantage is conspicuous in the case where the divided armature windings are wound by an automatic winder.

SUMMARY OF THE INVENTION

Therefore, a principal object of the present invention is to provide a motor with armature teeth and a field magnet, in which it is possible to reduce combined cogging force without difficulty of winding of divided armature windings.

Another object of the present invention is to provide a motor with armature teeth and a field magnet, in which by deriving a method for winding divided armature windings, combined cogging force becomes small even though teeth of armature and magnetic poles of a field magnet are arranged at equal pitch, respectively.

The other object of the present invention is to provide a novel method for winding divided armature windings.

A motor in accordance with the present invention comprises an armature having a plurality of teeth, respective teeth being arranged at equal pitch, divided armature windings of respective phases wound on respective teeth, and a field magnet having a plurality of magnetic poles being alternately magnetized in reverse polarity, respective magnetic poles being arranged at equal pitch. When the number of the magnetic poles of the field magnet is 2P and the number of phases of the divided armature windings is Q, the number T of teeth is determined in accordance with an equation $T = (P \pm N)Q$ (where $0 < N < P - 2P/Q$).

For example, if 2P=8, Q=3 and $\pm N = -1$, the number T of the teeth becomes T=9. Then, divided armature windings are wound on respective one of such nine teeth in accordance with a predetermined rule. In a motor of the embodiment, the number of simultaneous coggings becomes "1" which is the greatest common measure of T=9 and 2P=8. In addition, if 2P=8, Q=5 and $\pm N = -1$, the number T of the teeth becomes T=15. Respective divided armature windings of respective phases are wound on respective one of fifteen teeth in accordance with a predetermined rule. In a motor of the embodiment, the number of simultaneous coggings becomes "1" which is the greatest common measure of T=15 and 2P=8.

Thus, since the number of simultaneous coggings is made smaller than P as in the conventional motor, in accordance with the present invention, a motor in which combined cogging force is small in comparison with the conventional one is obtainable. Furthermore, in the U.S. Pat. No. 4,700,098 previously recited, the teeth are arranged at unequal pitch, and it was not easy to wind the divided armature windings; however, in accordance with the present invention, such a disadvantage does not take place because the teeth are arranged at equal pitch.

In a preferred embodiment, some teeth of the plurality of teeth have angles in electrical degrees different from ideal angles in electrical degrees of the divided armature windings to be wound thereon, respectively, and on the respective teeth, divided armature windings of the same phases as divided armature windings having the ideal angles in electrical degrees are wound.

In addition, winding directions of the divided armature windings to be wound on the respective teeth are the same directions of the divided armature windings having the ideal angles in electrical degrees.

The objects and other objects, features, aspects and advantages of the present invention will become more apparent from the following detailed description of the embodiments of the present invention when taken in conjunction with accompanying drawings.

BRIEF DESCRIPTION OF THE DRAWINGS

FIG. 8 is a waveform chart showing a range of angles in electrical degrees where magnetic flux of one magnetic pole of a field magnet is effectively crossed by one tooth of an armature core in the embodiment as shown in FIG. 3 and FIG. 4.

FIG. 10 is a vector diagram showing driving torque in the embodiment as shown in FIG. 3 and FIG. 4.

DETAIL DESCRIPTION OF THE PREFERRED EMBODIMENTS

Figure 1:
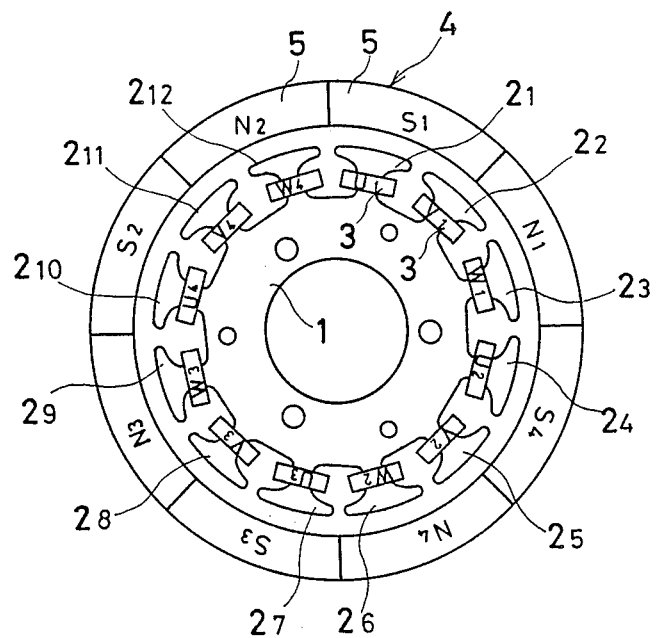
FIG. 1 is an illustrative view showing a conventional brushless motor being a background of the present invention.

In a motor having a relationship represented by the aforementioned equation (1), in order to make combined cogging force small, it is considered that the greatest common demoninator of T and 2P, that is, the number of simultaneous coggings is made smaller than P as in the conventional case. More specifically, in the conventional motor, since T is multiple of P, the greatest common demoninator of T and 2P is always P, and thus coggings of P-times always occur simultaneously. If a plurality of times of coggings occur simultaneously, combined cogging force thereof becomes larger than cogging force of one magnetic pole. Therefore, the inventor of the present invention, first, aimed at making the greatest common demoninator as described above smaller than P, that is, GCD<P.

In order to make the greatest common demoninator smaller than P, it is considered that an integer N is added or subtracted to or from the right or left member of the equation (1). Therefore, the inventor of the present invention proposes the following equation (2).

$$T=(P\pm N)Q \tag{2}$$

In the above described equation (2), in the case where $P=4$ and $Q=3$, when $\pm N=-1$, $T=(4-1)\times 3=9$. Therefore, the greatest common demoninator of T and 2P becomes "1". In addition, when $\pm N=+1$, under the same condition, $T=(4+1)\times 3=15$. Therefore, the greatest common demoninator of T and 2P becomes "1" again. Thus, in accordance with the equation (2), it is possible to make the number of simultaneous coggings being equal to the greatest common demoninator smaller than P as in the conventional case.

However, if an arbitrary integer N is simply substituted for the equation (2), the number T of the teeth becomes T<2P in certain circumstances. For example, in the case where $P=4$ and $Q=3$, if $\pm N=-2$, $T=(4-2)\times 3=6$, and thus the number T of the teeth becomes smaller than 2P, that is, $T(=6)<2P(=8)$.

Therefore, next, the inventor of the present invention evaluates a conditional equation of the integer N so as to be T>2P always. Such a conditional equation is given by the following equation (3).

$$0 < N < P - 2P/Q \qquad (3)$$

When the integer N is substituted for the equation (2) in accordance with the condition given by the equation (3), the number T of teeth always becomes larger than 2P in the equation (2), that is, T>2P.

The reason why the conditional equation of the integer N is to be considered is described in the following. If the number T of teeth of an armature becomes larger, pitch of a slot between adjacent teeth and thus width of respective one of teeth becomes narrower. Therefore, if and when divided armature windings are wound on the respective teeth as same turns as in the case where T<2P and the width of each tooth is wide, in the former, whole length of divided armature windings becomes shorter than that of the latter case. If the whole length of the divided armature windings is short, a whole resistance value of the divided armature windings becomes small, and thus a so-called copper loss can be reduced. Thus, in the present invention, the integer N is selected in the equation (2) under the condition that T>2P is satisfied in accordance with the equation (3).

EMBODIMENTS

Figure 3:
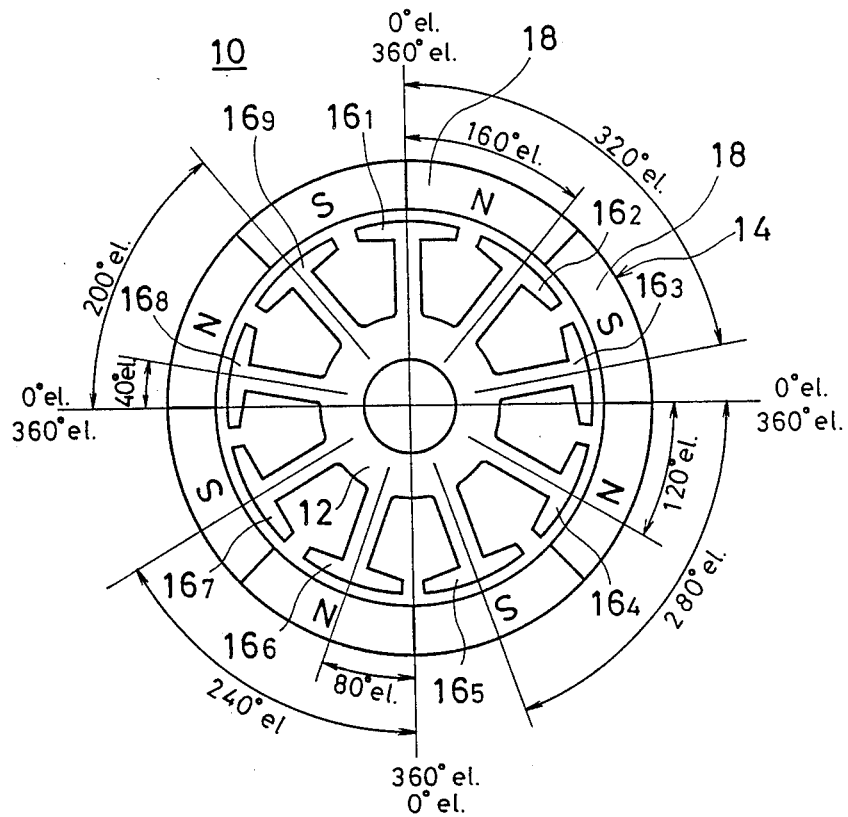
FIG. 3 is an illustrative view showing respective teeth of an armature core and angles in electrical degrees thereof in one embodiment in accordance with the present invention.
Figure 4:
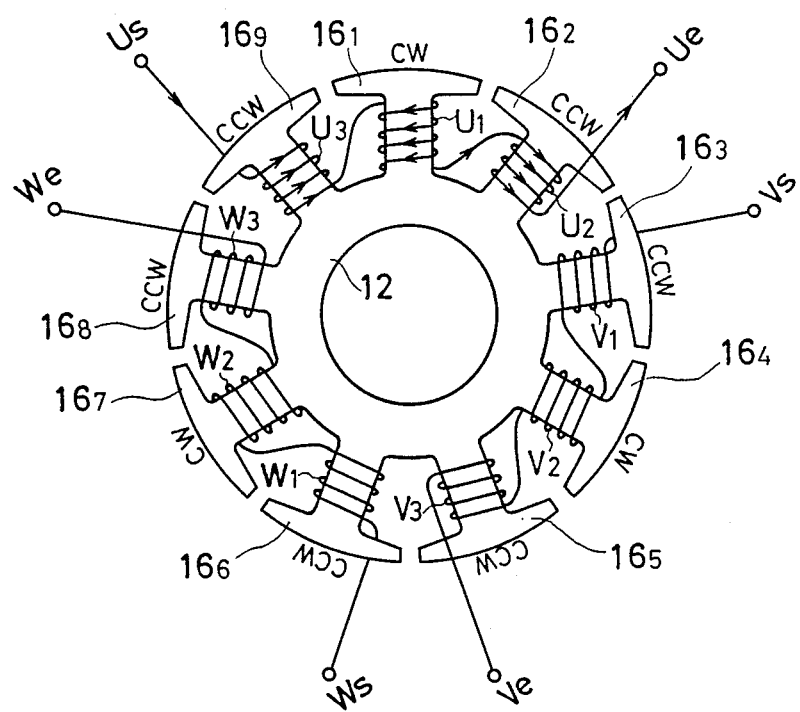
FIG. 4 is an illustrative view showing a state where divided armature windings are wound on respective teeth in FIG. 3 embodiment.

FIG. 3 and FIG. 4 show a motor 10 of one embodiment in accordance with the present invention. Since 2P=8, Q=3 and ±N=−1, the number T of the teeth is set as T=9 in accordance with the equations (2) and (3). The motor 10 of this embodiment includes an armature 12 and a field magnet 14. The field magnet 14 has eight magnet poles 18 in accordance with 2P=8, and respective magnetic poles 18 are arranged at equal pitch and magnetized alternately in reverse polarity, that is, N or S. Therefore, 360 electrical degrees of the field magnet 14 correspond to 90 mechanical degrees as shown in FIG. 3.

On the other hand, in the armature 12, nine teeth $16_1$–$16_9$ are formed in accordance with T=9. Respective teeth $16_1$–$16_9$ are formed at equal pitch which is 160 electrical degrees on the basis of angles in electrical degrees of the field magnet 14. Therefore, the tooth $16_1$ corresponding to 0 mechanical degrees is 0 electrical degrees, the tooth $16_2$ is 160 electrical degrees, and the tooth $16_3$ is 320 electrical degrees. The angles in electrical degrees of the tooth $16_4$ is 120 electrical degrees on the basis of 0 electrical degrees corresponding to 90 mechanical degrees, and the tooth $16_5$ is 280 electrical degrees. In addition, on the basis of 0 electrical degrees corresponding to 180 mechanical degrees, the tooth $16_6$ is 80 electrical degrees, and the tooth $16_7$ is 240 electrical degrees. In addition, on the basis of 0 electrical degrees corresponding to 270 mechanical degrees, the tooth $16_8$ is 40 electrical degrees, and the tooth $16_9$ is 200 electrical degrees. The angles in electrical degrees of the respective teeth $16_1$–$16_9$ are thus evaluated and indicated in the table 1.

Next, armature windings to be wound on the respective teeth $16_1$–$16_9$ will be considered. In the embodiment shown, since Q=3, divided armature windings of U-phase, V-phase or W-phase are wound on respective one of teeth $16_1$–$16_9$. On the other hand, in three-phase motor, ideal angles in electrical degrees of respective phases are determined as follows. On the basis of U-phase, V-phase and W-phase have to be phase differences of 120 electrical degrees and 240 electrical degrees with respect to the U-phase, respectively. Then, −U-phase, −V-phase and −W-phase have relationships of 180 electrical degrees with respect to the U-phase, V-phase and W-phase, respectively, and therefore, −U-phase, −V-phase and −W-phase become 180 electrical degrees, 300 electrical degrees and 60 electrical degrees, respectively. Such relationships are indicated in the table 2.

In accordance with the present invention, T is not equal to 2P, therefore, actual angles in electrical degrees of respective teeth can not be wholly coincident with respective ideal angles in electrical degrees as shown in table 2. Then, in accordance with comparison between the actual angles in electrical degrees of respective teeth $16_1$–$16_9$ as shown in table 2 and the ideal angles in electrical degrees as shown in table 2, divided armature windings of the phase which is closest to the ideal angle in electrical degrees are wound on the respective teeth $16_1$–$16_9$.

Since the actual angle of the tooth $16_1$ is 0 electrical degrees as shown in table 1, the tooth $16_1$ is closest to the ideal angle of 0 electrical degrees in the table 2. Therefore, on the tooth $16_1$, divided armature windings $U_1$ of the U-phase is wound in a clockwise direction as shown in FIG. 4.

Since the actual angle of the tooth $16_2$ is 160 electrical degrees as shown in the table 1, the tooth $16_2$ is closest to the ideal angle of 180 electrical degrees in the table 2. Therefore, on the tooth $16_2$, divided armature winding $U_2$ of the U-phase are wound in a counter clockwise direction as shown in FIG. 4. Thus, on the phase to which the sign (−) is added in the table 2, divided armature windings of the same phase to which the sign (−) is not added is wound in the reverse direction.

Since the actual angle of the tooth $16_3$ is 320 electrical degrees as shown in the table 1, the tooth $16_3$ is closest to the ideal angle of 300 electrical degrees in the table 2. Therefore, on the tooth $16_3$, divided armature winding $V_1$ of the V-phase is wound in the counter clockwise direction as shown in FIG. 4.

Since the actual angle of the tooth $16_4$ is 120 electrical degrees as shown in the table 1, the tooth $16_4$ is closest to the ideal angle of 120 electrical degrees in the table 2. Therefore, on the tooth $16_4$, divided armature winding $V_2$ of the V-phase is wound in the clockwise direction as shown in FIG. 4.

Since the actual angle of the tooth $16_5$ is 280 electrical degrees as shown in the table 1, the tooth $16_5$ is closest to the ideal angle of 300 electrical degrees in the table 2. Therefore, on the tooth $16_5$, divided armature winding $V_3$ of the V-phase is wound in the counter clockwise direction as shown in FIG. 4.

Since the actual angle of the tooth $16_6$ is 80 electrical degrees as shown in the table 1, the tooth $16_6$ is closest to the ideal angle of 60 electrical degrees in the table 2. Therefore, on the tooth $16_6$, divided armature winding $W_1$ of the W-phase is wound in the counter clockwise direction as shown in FIG. 4.

Since the actual angle of the tooth $16_7$ is 240 electrical degrees as shown in the table 1, the tooth $16_7$ is closest to the ideal angle of 240 electrical degrees in the table 2. Therefore, on the tooth $16_7$, divided armature winding $W_2$ of the W-phase is wound in the clockwise direction as shown in FIG. 4.

Since the actual angle of the tooth $16_8$ is 40 electrical degrees as shown in the table 1, the tooth $16_8$ is closest to the ideal angle of 60 electrical degrees in the table 2. Therefore, on the tooth $16_8$, divided armature winding $W_3$ of the W-phase is wound in the clockwise direction as shown in FIG. 4.

Since the actual angle of the last tooth $16_9$ is 200 electrical degrees as shown in the table 1, the tooth $16_9$ is closest to the ideal angle of 180 electrical degrees in the table 2. Therefore, on the tooth $16_9$, divided armature winding $U_3$ of the U-phase is wound in the counter clockwise direction as shown in FIG. 4.

Thus, the phases and winding directions of the respective divided armature windings to be wound on the respective teeth $16_1$–$16_9$ are determined in the embodiment shown in FIG. 3 and FIG. 4. The phases and winding directions thus determined are indicated in the table 3. Meanwhile, in the table 3, other than actual angles in electrical degrees ALPHA of the respective teeth $16_1$–$16_9$, differential angles in electrical degrees DELTA being deviated from the ideal angles in electrical degrees as shown in the table 2 are also indicated.

In accordance with a result as shown in the table 3, the divided armature windings $U_1$–$U_3$, $V_1$–$V_3$ and $W_1$–$W_3$ are respectively wound on the respective teeth $16_1$–$16_9$. More specifically, the divided armature windings $U_1$–$U_3$ of the U-phase are wound on the teeth $16_1$, $16_2$ and $16_9$, the divided armature windings $V_1$–$V_3$ of the V-phase are wound on the teeth $16_3$, $16_4$ and $16_5$, and the divided armature windings $W_1$–$W_3$ of the W-phase are wound on the teeth $16_6$, $16_7$ and $16_8$.

In addition, in FIG. 4, the winding directions of the respective divided armature windings to be wound on the respective teeth $16_1$–$16_9$ are indicated as CW (the clockwise direction) or CCW (the counter clockwise direction), and starting ends and terminating ends of the divided armature windings of the respective phases are indicated as subscripts "s" and "e" which are added to the characters U, V and W representing the phases.

Thus, after the number T of teeth of the armature 12 of the motor 10 were determined in the accordance with the equations (2) and (3), the phases and winding directions of the divided armature windings to be wound on the respective teeth $16_1$–$16_9$ are determined. Such procedure is shown in a flowchart of FIG. 5.

Figure 5:
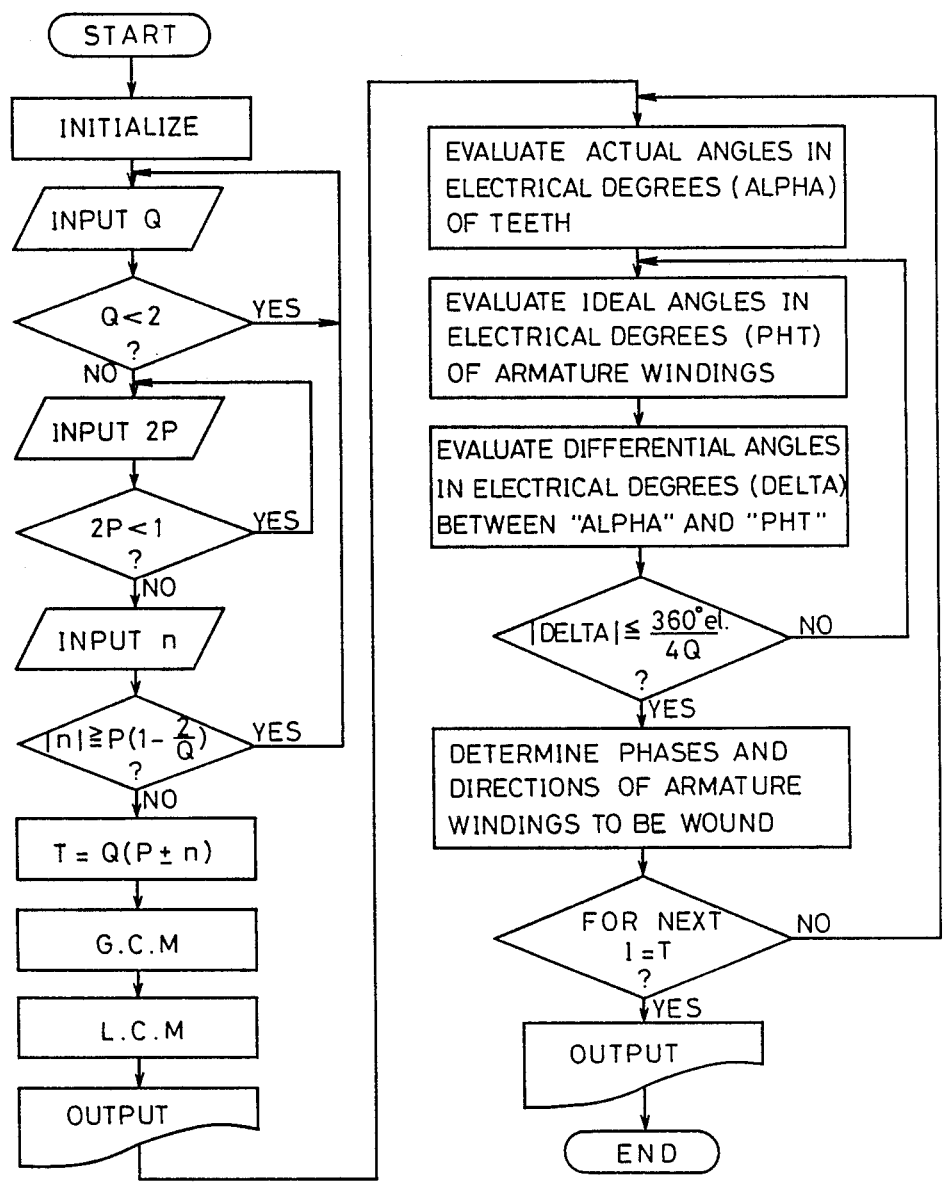
FIG. 5 is a flowchart showing procedure for determining phases and winding directions of divided armature windings to be wound on respective teeth.

In FIG. 5, first, the number Q of the phases of the armature windings is inputted as the number larger than "2". Next, the number 2P of the magnetic pole of the field magnet is inputted as the number larger than "1". Then, the integer N to be substituted for the equation (2) is inputted. At this time, the absolute value of the integer N is to be smaller than $P(1-2P/Q)$ in accordance with the equation (3). The values of Q, 2P and N are substituted for the equation (2) to evaluate the number T of the teeth.

Then, the greatest common demoninator of T and 2P and the least common multiple of T and 2P are respectively evaluated.

Next, the actual angles in electrical degrees ALPHA of respective teeth which are determined in accordance with the equation (2) and indicated in the table 1 are evaluated, and the ideal angles in electrical degrees PHT as shown in the table 2 are evaluated. Thereafter, differential angles in electrical degrees DELTA thereof are calculated as shown in the table 3, and it is determined whether the absolute value thereof satisfies the condition of "|DELTA|≦360 electrical degrees/4Q". This is done to confirm whether the phases of respective teeth are set on the basis the closest ideal angles in electrical degrees PHT in determining the phases of respective teeth $16_1$–$16_9$. This means that if |DELTA|>360 electrical degrees/4Q, the phases of respective teeth are not determined on the basis of the ideal angles in electrical degrees PHT. Thereafter, such procedure is repeated to determined the phases and winding directions of all of the divided armature windings to be wound on the respective teeth $16_1$–$16_9$.

In the conventional motor as shown in FIG. 1, since T=12 and 2P=8, the number of simultaneous coggings is "4".

Figure 2:
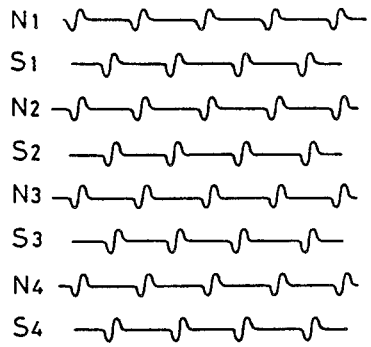
FIG. 2 is a waveform chart showing coggings of respective magnetic poles and combined cogging force in a conventional example as shown in FIG. 1.
Figure 2:
Figure 6:
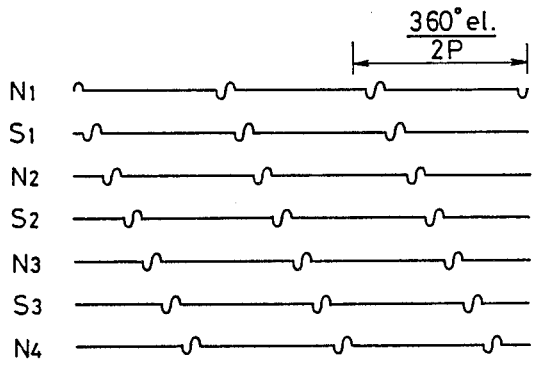
FIG. 6 is a waveform chart showing coggings of respective magnetic poles and combined cogging force in the embodiment as shown in FIG. 3 and FIG. 4.
Figure 6:
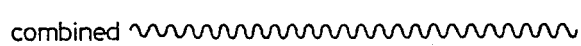

By contrast, in the motor 10 of the embodiment as shown in FIG. 3 and FIG. 4, since the greatest common demoninator of T=9 and 2P=8 is "1", the number of simultaneous coggings becomes "1", therefore, coggings of the respective magnetic poles are distributed and thus do not lie one upon another as shown in FIG. 6. Therefore, as apparent from FIG. 6, the combined cogging force in this embodiment is always the same or less than the cogging force generated by one magnetic pole and can be reduced ¼ or less than that of the conventional brushless motor as shown in FIG. 2.

By the way, in the motor as shown in the table 3, since 2P=8 and T=9 and the number of coggings for each one rotation is the least common multiple of 2P and T as described above, the number of coggings for each one rotation becomes "72". Therefore, cogging-occuring angle becomes 20 electrical degrees (=360 electrical degrees×4/72).

By contrast, in FIG. 1 conventional motor as shown in the table 4, since 2P=8 and T=12, the number of coggings occurring for each one rotation becomes "24". Therefore, the cogging-occurring angle is 60 electrical degrees (=360 electrical degrees×4/24).

Figure 7:
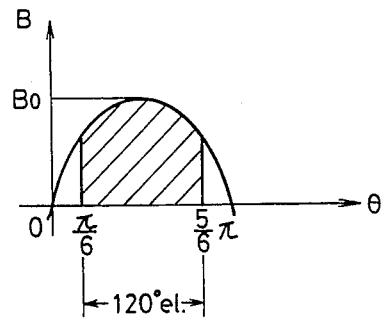
FIG. 7 is a waveform chart showing a range of angles in electrical degrees where magnetic flux of one magnetic pole of a field magnet is effectively crossed by one tooth of an armature core in the embodiment as shown in FIG. 1.

Next, in the conventional motor as shown in FIG. 1, since pitch angle between the adjacent teeth is 120 electrical degrees, when a function of magnetic flux density of one magnetic pole of the field magnet is $B = B_0 \sin\theta$, a range where the magnetic flux of one magnetic pole is effectively crossed by one tooth is, as shown in FIG. 7, 120 electrical degrees from $\pi/6$ to $5\pi/6$. Therefore, the magnetic flux $\phi$ is given by the following equation (4).

$$\phi = \int_{\pi/6}^{5\pi/6} B_0 \sin\theta \, d\theta \qquad (4)$$
$$= 2 \int_0^{2\pi/3} B_0 \cos\theta \, d\theta = \sqrt{3} \, B_0$$

On the other hand, in the motor 10 of the embodiment as shown in FIG. 3 and FIG. 4, the pitch angle between the adjacent teeth is 160 electrical degrees, and therefore, a range where the magnetic flux of one magnet pole is effectively crossed by one tooth is, as shown in FIG. 8, 160 electrical degrees from $\pi/18$ to $17\pi/18$. Therefore, the magnetic flux $\phi'$ is given by the following equation (5).

$$\phi' = \int_{\pi/18}^{17\pi/18} B_0 \sin\theta \, d\theta \qquad (5)$$
$$= 2 \int_0^{4\pi/9} B_0 \cos\theta \, d\theta = 1.97 \, B_0$$

Therefore, when the conventional motor of FIG. 1 and the motor 10 as shown in FIG. 3 and FIG. 4 are compared with each other, if the number of turns of one of the divided armature winding wound on the respective one of teeth is equal to each other, a ratio q of the magnetic flux is given by the following equation (6).

$$q = \phi'/\phi = 1.97B_0/\sqrt{3}B_0 = 1.137 \tag{6}$$

Next, the total number of conductors crossing to the magnetic flux of the field magnet will be considered. When the number of turns of one of the divided armature windings wound on respective one of teeth is equal to each other and the total number of the conductors crossing to the magnetic flux of the field magnet is the same, the number of turns of the divided armature winding wound on respective one of teeth is in inverse proportion to the number of teeth. Therefore, since the number of teeth T=12 in the conventional motor of FIG. 1 and T=9 in the motor 10 of the embodiment as shown in FIG. 3 and FIG. 4, a ratio r thereof is given by the following equation (7).

$$r = 12/9 = 1.333 \tag{7}$$

Therefore, when the efficiency of conventional motor of FIG. 1 is "1", the efficiency E of the motor 10 of the embodiment as shown in FIG. 3 and FIG. 4 is given from the following equation (8).

$$E = q\,r = 1.137 \times 1.333 = 1.516 \tag{8}$$

Figure 9:
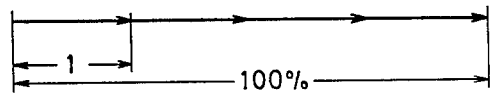
FIG. 9 is a vector diagram showing driving torque in the conventional brushless motor as shown in FIG. 1.

Furthermore, in the conventional motor of FIG. 1, as shown in the table 4, the actual angles in electrical degrees of the respective teeth are wholly and completely coincident with respective ideal angles in electrical degrees; however, in the motor 10 as shown in FIG. 3 and FIG. 4, as shown in the table 3, in paying attention to the U-phase, the teeth $16_2$ and $16_9$ are deviated from the ideal angles by −20 electrical degrees and 20 electrical degrees. Therefore, the value which is evaluated by the equation (8) as it is does not mean the efficiency of the motor. A vector diagram in connection to one phase is shown in FIG. 10 where vectors are illustrated taking into consideration of the deviation angles with respect to the ideal angles. In the case of a vector diagram of conventional motor, since all of teeth are wholly coincident with the ideal angles, such vectors are in linear line. However, in FIG. 10, the vectors are not in linear line because of the deviation angles. Then, the combined efficiency E is given by following equation (9) when length of a single vector of FIG. 9 is "1".

$$\begin{aligned} E &= 1.516\,[1 + \cos(-20°) + \cos 20°]/4 \\ &= 1.091 \end{aligned} \tag{9}$$

More specifically, in the motor 10 as shown in FIG. 3 and FIG. 4, in paying attention to the U-phase, for example, even though the angles of the teeth $16_2$ and $16_9$ are deviated from the ideal angles by −20 electrical degrees and 20 electrical degrees, respectively, whole efficiency of the U-phase becomes larger than that of the conventional motor as shown in FIG. 1 by 9.1%. Therefore, in the motor 10 of the embodiment as shown in FIG. 3 and FIG. 4, driving torque for each phase becomes larger than 9.1% than that of the conventional motor of FIG. 1.

Figure 11:
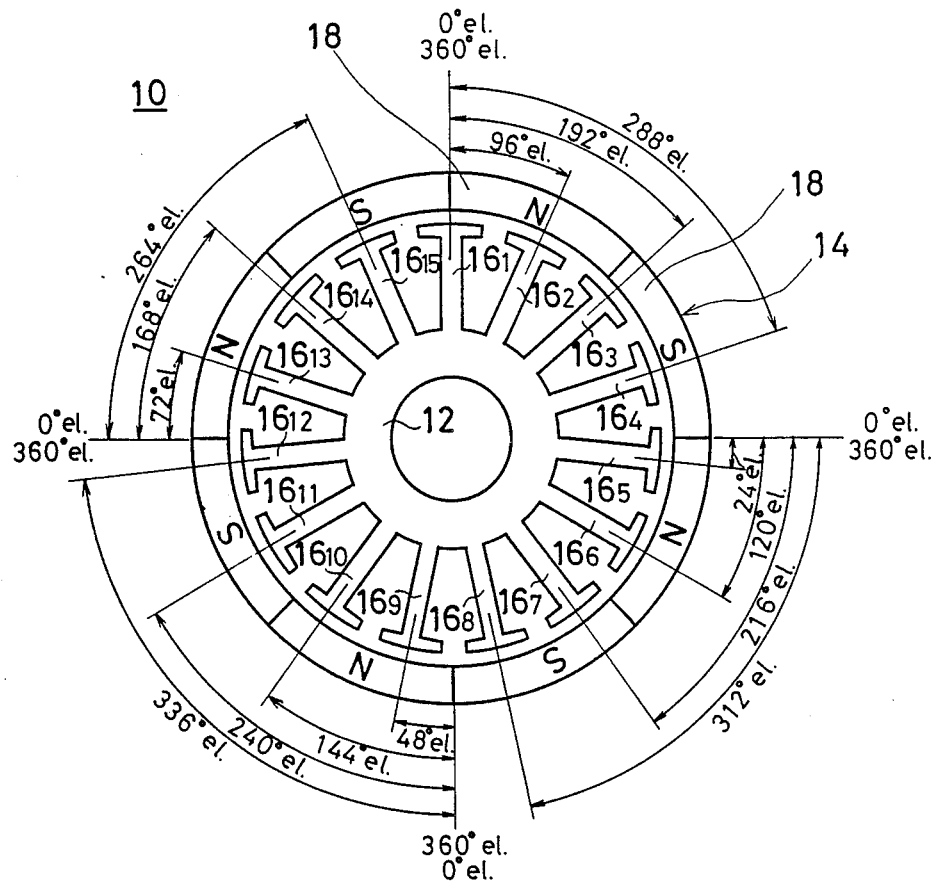
FIG. 11 is an illustrative view showing respective teeth of an armature core and angles in electrical degrees thereof in another embodiment in accordance with the present invention.

FIG. 11 shows a motor of another embodiment in accordance with the present invention. In this embodiment, 2P=8, Q=5 and ±N=−1 are respectively substituted for the equations (2) and (3), and therefore, fifteen teeth are formed at equal pitch.

More specifically, on the armature 12, fifteen teeth $16_1$–$16_{15}$ are formed in accordance with T=15. Since 360 electrical degrees is equal to 90 mechanical degrees of the field magnet 14, the pitch between the adjacent teeth is 96 electrical degrees (=360×4/15). Therefore, on the basis of the angle of the tooth $16_1$, the angles of the teeth $16_2$, $16_3$ and $16_4$ becomes 96 electrical degrees, 192 electrical degrees and 288 electrical degrees, respectively.

Then, the angles of the respective teeth $16_5$–$16_{15}$ can be evaluated on the basis of respective angles of 0 electrical degrees corresponding to 90 mechanical degrees, 180 mechanical degrees and 270 mechanical degrees as shown in FIG. 11. The angles in electrical degrees of the respective teeth $16_1$–$16_{15}$ thus evaluated are indicated in the table 5.

Next, in this embodiment, since Q=5, divided armature windings of I, II, III, IV or V -phase are wound on respective one of the teeth $16_1$–$16_{15}$. On the other hand, in the five-phase motor, ideal angles in electrical degrees of respective phases are decided as follows. For example, on the basis of the I-phase, the II-phase, III-phase, IV-phase and V -phase must have phase differences of 72 electrical degrees, 144 electrical degrees, 216 electrical degrees and 288 electrical degrees, respectively. Then, −I -phase, −II -phase, −III -phase, −IV -phase and −V -phase are arranged at the angles of 180 electrical degrees being different from respective angles of the I-phase, II-phase, III-phase, IV-phase and V-phase have phase differences of 180 electrical degrees, 252 electrical degrees, 324 electrical degrees, 36 electrical degrees and 108 electrical degrees on the basis of the I-phase, respectively. The relationships between the respective phases and the ideal angles in electrical degrees thereof are indicated in the table 6.

In this embodiment, since the number T of the teeth are determined under the condition of T>2P, the actual angles in electrical degrees of respective teeth can not be wholly coincident with the ideal angles in electrical degrees the table 6. Therefore, through comparison of the actual angles in electrical degrees of the teeth $16_1$–$16_{15}$ as shown in the table 5 and the ideal angles in electrical degrees as shown in the table 6, on the respective one of teeth $16_1$–$16_{15}$, divided armature winding of the phase which is closest to the ideal angle in electrical degrees as shown in the table 6 are wound.

The actual angle of the tooth $16_1$ is, as shown in the table 5, 0 electrical degrees and coincident with the ideal angle of 0 electrical degrees of the I-phase as shown in the table 6. Therefore, on the tooth $16_1$, divided armature winding $I_1$ of the I-phase is wound in the clockwise direction as shown in FIG. 12.

Since the actual angle of the tooth $16_2$ is 96 electrical degrees as shown in the table 5, the tooth $16_2$ is closest to the ideal angle of 108 electrical degrees in the table 6. Therefore, on the tooth $16_2$, divided armature winding of the V-phase are wound in a counter clockwise direction as shown in FIG. 12. Thus, on the phase to which the sign (−) is added in the table 6, divided armature windings of the same phase to which the sign (−) is not added is wound in the reverse direction.

Since the actual angle of the tooth $16_3$ is 192 electrical degrees as shown in the table 5, the tooth $16_3$ is closest to the ideal angle of 180 electrical degrees in the table 6.

Figure 12:
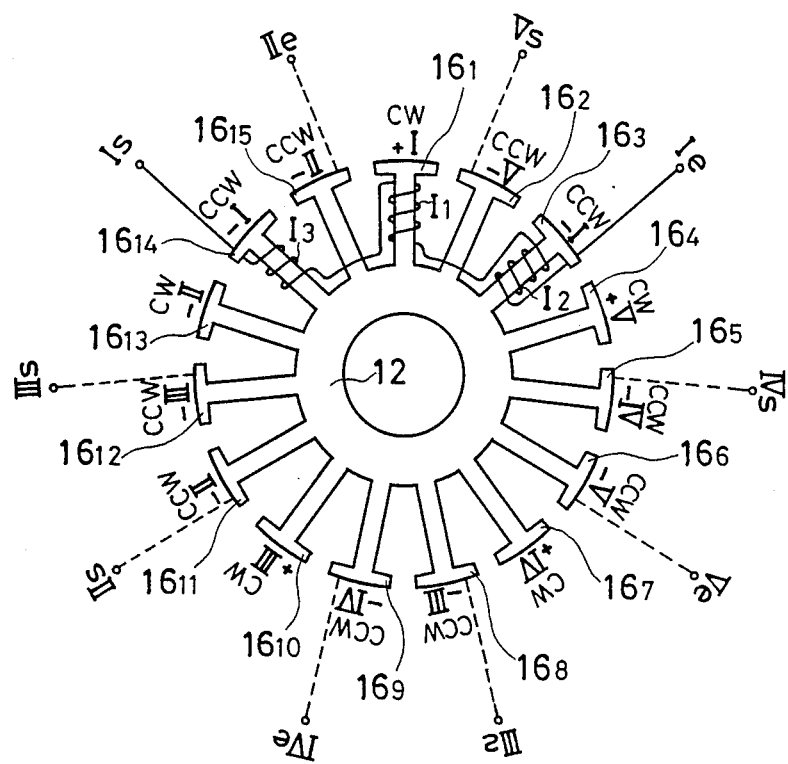
FIG. 12 is an illustrative view showing a state where divided armature windings are wound on respective teeth in FIG. 11 embodiment.

Therefore, on the tooth $16_3$, divided armature winding $I_2$ of the I-phase is wound in the counter clockwise direction as shown in FIG. 12.

Thus, the phases and winding directions of divided armature windings to be wound on the respective teeth $16_1$–$16_{15}$ of the embodiment as shown in FIG. 11 and FIG. 12 are determined in accordance with FIG. 5 flow chart. Such determined phases and winding directions of the divided armature windings are indicated in the table 7. Meanwhile, in the table 7, other than actual angles in electrical degrees ALPHA of the respective teeth $16_1$–$16_{15}$, differential angles DELTA with respect to the ideal angles in electrical degrees as shown in the table 6 are also indicated.

In accordance with a result as shown in the table 7, the divided armature windings are respectively wound on the respective teeth $16_1$–$16_{15}$. More specifically, the divided armature windings of the I-phase are wound on the teeth $16_1$, $16_3$ and $16_{14}$, the divided armature windings of the II-phase are wound on the teeth $16_{11}$, $16_{13}$ and $16_{15}$, the divided armature windings of the III-phase are wound on the teeth $16_8$, $16_{10}$ and $16_{12}$, the divided armature windings of the IV-phase are wound on the teeth $16_5$, $16_7$ and $16_9$, and the divided armature windings of the V-phase are wound on the teeth $16_2$, $16_4$ and $16_6$. In addition, in order to avoid to become complex, only the divided armature windings of the I-phase are illustrated in FIG. 12.

Figure 13:
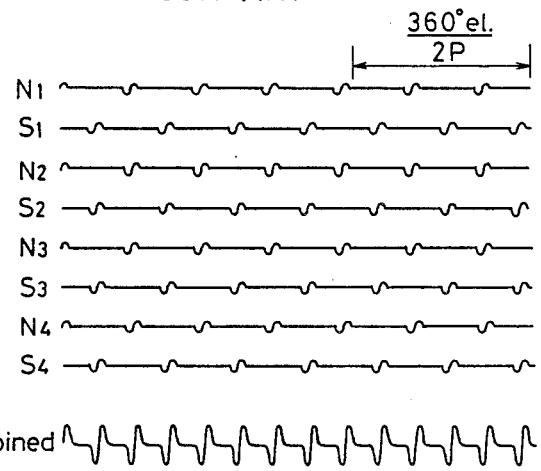
FIG. 13 is a waveform chart showing coggings of respective magnetic poles and combined cogging force in a conventional brushless motor of five phases, eight magnetic poles and twenty slots which is to be compared with the embodiment as shown in FIG. 11 and FIG. 12.

A motor to be compared with the motor 10 as shown in FIG. 11 and FIG. 12 is a motor of five phases, eight magnet poles, and twenty slots, and in this conventional motor, since T=20 and 2P=8, the number of simultaneous coggings is "4". Therefore, combined cogging force becomes four-times of the cogging of one magnetic pole as shown in FIG. 13.

Figure 14:
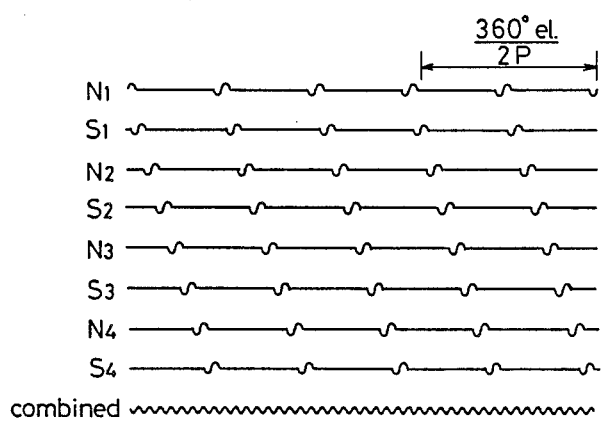
FIG. 14 is a waveform chart showing coggings of respective magnetic poles and combined cogging force in the embodiment as shown in FIG. 11 and FIG. 12.

By contrast, in the motor 10 of the embodiment as shown in FIG. 11 and FIG. 12, since the greatest common measure of T=15 and 2P=8 is "1", the number of simultaneous coggings becomes "1", therefore, coggings of the respective magnet poles are distributed and thus do not lie one upon another as shown in FIG. 14. Therefore, as apparent from FIG. 14, the combined cogging force in this embodiment is always the same or less than the cogging force generated by one magnetic pole and can be reduced ¼ or less than that of the conventional brushless motor, as shown in FIG. 13.

By the way, in the motor as shown in the table 7, since 2P=8 and T=15 and the number of coggings for each one rotation is the least common multiple of 2P and T, the number of coggings for each one rotation becomes "120". Therefore, the cogging-occurring angle becomes 12 electrical degrees (=360 electrical degrees $\times 4/120$).

By contrast, in the conventional motor as shown in the table 8, since 2P=8 and T=20, the number of coggings for each one rotation becomes "40". Therefore, the cogging-occurring angle is 36 electrical degrees (=360 electrical degrees $\times 4/40$).

Figure 15:
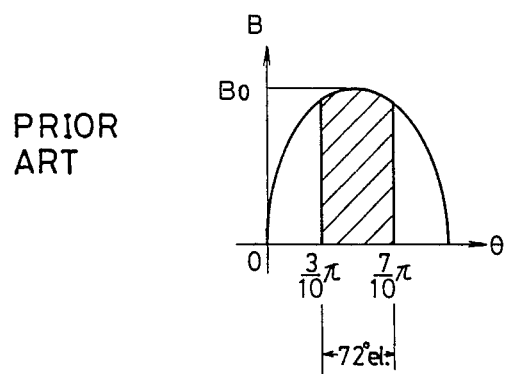
FIG. 15 is a waveform chart showing a range of angles in electrical degrees where magnetic flux of one magnetic pole of a field magnet is effectively crossed by one tooth of an armature core in the conventional brushless motor of five phases, eight magnetic poles and twenty slots.

Next, in the conventional motor of five phases, eight magnet poles and twenty slots, since a pitch angle between the adjacent teeth is 72 electrical degrees, when a function of magnetic flux density of one magnetic pole of the field magnet is $B = B_0 \sin\theta$, a range where the magnetic flux of one magnetic pole is effectively crossed by one tooth is, as shown in FIG. 15, 72 electrical degrees from $3\pi/10$ to $7\pi/10$. Therefore, the magnetic flux $\phi$ is given by the following equation (10).

$$\phi = \int_{3\pi/10}^{7\pi/10} B_0 \sin\theta \, d\theta = 1.176 \, B_0 \quad (10)$$

Figure 16:
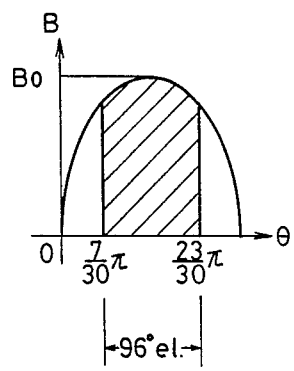
FIG. 16 is a waveform showing a range of angle in electrical degrees where magnetic flux of one magnetic pole of a field magnet is effectively crossed by one tooth of an armature core in the embodiment as shown in FIG. 11 and FIG. 12.

On the other hand, in the motor 10 of the embodiment as shown in FIG. 11 and FIG. 13, the pitch angle between the adjacent teeth is 96 electrical degrees, and therefore, a range where the magnetic flux of one magnet pole is effectively crossed by one tooth is, as shown in FIG. 16, 96 electrical degrees from $7\pi/30$ to $23\pi/30$. Therefore, the magnetic flux $\phi'$ is given by the following equation (11).

$$\phi' = \int_{7\pi/30}^{23\pi/30} B_0 \sin\theta \, d\theta = 1.486 \, B_0 \quad (11)$$

Therefore, when the conventional motor and the motor 10 as shown in FIG. 11 and FIG. 12 are compared with each other, if the number of turns of one of the divided armature windings wound on the respective one of teeth is equal to each other, a ratio q of the magnetic flux is given by the following equation (12).

$$q = \phi'/\phi = 1.486 B_0 / 1.186 B_0 = 1.264 \quad (12)$$

Next, the total number of conductors crossing to the magnetic flux of the field magnet will be considered. When the number of turns of one of the divided armature winding wound on respective one of teeth is equal to each other and the total number of the conductors crossing to the magnetic flux of the field magnet is the same, the number of turns of the divided armature winding wound on respective one of teeth is in inverse proportion to the number of teeth. Therefore, since the number of teeth T=20 in the conventional motor and T=15 in the motor 10 of the embodiment as shown in FIG. 11 and FIG. 12, a ratio r thereof is given by the following equation (13).

$$r = 20/15 = 1.333 \quad (13)$$

Therefore, when the efficiency of conventional motor is "1", the efficiency E of the motor 10 of the embodiment as shown in FIG. 11 and FIG. 12 is given from the following equation (14).

$$E = qr = 1.264 \times 1.333 = 1.685 \quad (14)$$

Figure 17:
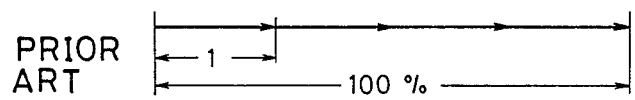
FIG. 17 is a vector diagram showing driving torque in the conventional brushless motor of five phases, eight magnetic poles and twenty slots.
Figure 18:
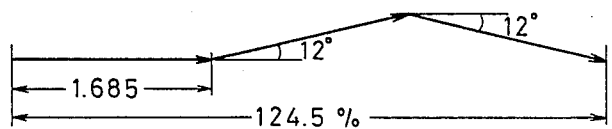
FIG. 18 is a vector diagram showing driving torque in the embodiment as shown in FIG. 11 and FIG. 12.

Furthermore, in the conventional motor, as shown in the table 8, the angles in electrical degrees of the respective teeth are wholly and completely coincident with respective ideal angle in electrical degrees; however, in the motor 10 as shown in FIG. 11 and FIG. 12, as shown in the table 7, in paying attention to the I-phase, the teeth $16_3$ and $16_{14}$ are deviated from the ideal angles by $-12$ electrical degrees and 12 electrical degrees. Therefore, the value which is evaluated by the equation (8) as it is does not mean the efficiency of the motor. A vector diagram in connection to one phase is shown in FIG. 18 where the vectors are illustrated taking into consideration of the deviation angles with respect to the ideal angles. In the case of a vector diagram of conventional motor, since all of teeth are wholly coincident with the ideal angles, such vectors are in linear line. However, in FIG. 18, the vectors are not in linear line because of the deviation angles. Then, the combined efficiency E is given by following equation (15) when the length of a single vector of FIG. 17 is "1".

$$E = 1.685 [1 + \cos(-12°) + \cos 12°]/4 \quad (15)$$
$$= 1.245$$

More specifically, in the motor 10 as shown in FIG. 11 and FIG. 12, in paying attention to the I-phase, for example, even though the angles of the teeth $16_3$ and $16_{14}$ are deviated from the ideal angles by $-12$ electrical degrees and 12 electrical degrees, respectively, whole efficiency of the I-phase becomes larger than that of the conventional motor by 24.5%. Therefore, in the motor 10 of the embodiment as shown in FIG. 11 and FIG. 12, driving torque for each phase becomes larger than 24.5% than that of the conventional motor.

In addition, if 2P=8, Q=3 and $\pm N=1$ are substituted for the equations (2) and (3), the number T becomes T=15.

When T=15 as in this case, fifteen teeth $16_1$–$16_{15}$ are formed on the armature as same as FIG. 11. Then, the actual angles in electrical degrees of respective teeth $16_1$–$16_{15}$ on the basis of the tooth $16_1$ are indicated in the table 9. In the motor of this embodiment is of three-phase, and therefore, the ideal angles in electrical degrees thereof are the same as that of the table 2. Therefore, the divided armature windings of the respective phases are wound on the respective teeth $16_1$–$16_5$ in the winding directions as shown in the table 9. Since the motor of this embodiment is three-phases, eight magnetic poles and fifteen slots and thus 2P=8 and T=15, and therefore, the number of coggings for each one rotation becomes "120" which is the least common multiple of 2P=8 and T=15. Therefore, the cogging-occurring angle thereof becomes 12 electrical degrees (=360 electrical degrees ×4/120). The number of simultaneous coggings becomes "1" which is the greatest common demoninator of 2P=8 and T=15.

Next, if 2P=16, Q=3 and $\pm N=-1$ are substituted for the equations (2) and (3), the number T becomes T=21.

When T=21 as in this case, although not shown, twenty-one teeth $16_1$–$16_{21}$ are formed on the armature. The actual angles in electrical degrees of the respective teeth $16_1$–$16_{21}$ on the basis of the tooth $16_1$ are indicated in the table 10. Since the motor of this embodiment is three-phase, the ideal angle in electrical degrees are the same as that shown in the table 2. Therefore, on the respective teeth $16_1$–$16_{21}$, divided armature windings of the respective phases are wound in the winding directions as shown in the table 10. Since the motor of this embodiment is the motor of three phases, sixteen magnetic poles and twenty-one slots and thus 2P=16 and T=21, the number of coggings for each one rotation becomes "336" which is the least common multiple of 2P=16 and T=21. Therefore, the cogging-occurring angle thereof becomes 8.56 electrical degrees (=360 electrical degrees ×8/336). The number of simultaneous coggings becomes "1" which is the greatest common demoninator of 2P=16 and T=21.

By contrast, in the conventional motor, if the motor is three phases and sixteen magnet poles, the number of teeth always becomes "24" in accordance with the equation (1). Therefore, in the conventional one, although not shown, twenty-four teeth $2_1$–$2_{24}$ are formed as shown in the table 11, and divided armature windings are wound thereon. In the conventional one, the number of coggings for each one rotation becomes "48" which is the least common multiple of 2P=16 and T=24. Therefore, the cogging-occurring angle thereof becomes 60 electrical degrees (=360×8/48). The number of simultaneous coggings becomes "8" which is the greatest common measure of 2P=8 and T=24.

Next, if 2P=16, Q=3 and $\pm N=-2$ are substituted for the equations (2) and (3), the number T becomes T=18.

When T=18 as in this case, although not shown, eighteen teeth $16_1$–$16_{18}$ are formed on the armature. The actual angles in electrical degrees of the respective teeth $16_1$–$16_{18}$ on the basis of the tooth $16_1$ are indicated in the table 12. Since the motor of this embodiment is three-phase, the ideal angle in electrical degrees are the same as that shown in the table 2. Therefore, on the respective teeth $16_1$–$16_{18}$, divided armature windings of the respective phases are wound in the winding directions as shown in the table 12. Since the motor of this embodiment is the motor of three phases, sixteen magnetic poles, and 18 slots and thus 2P=16 and T=18, the number of coggings for each one rotation becomes "144" which is the least common multiple of 2P=16 and T=18. Therefore, the cogging-occurring angle thereof becomes 20 electrical degrees (=360 electrical degrees ×8/144). The number of simultaneous coggings becomes "2" which is the greatest common measure of 2P=16 and T=18.

Furthermore, if 2P=16, Q=3 and $\pm N=+1$ are substituted for the equations (2) and (3), the number T becomes T=27.

When T=27 as in this case, although not shown, twenty-seven teeth $16_1$–$16_{27}$ are formed on the armature. The actual angles in electrical degrees of the respective teeth $16_1$–$16_{27}$ on the basis of the tooth $16_1$ are indicated in the table 13. Since the motor of this embodiment is three-phase, the ideal angle in electrical degrees are the same as that shown in the table 2. Therefore, on the respective teeth $16_1$–$16_{27}$, divided armature windings of the respective phases are wound in the winding directions as shown in the table 13. Since the motor of this embodiment is the motor of three phases, sixteen magnetic poles, and twenty-seven slots and thus 2P=16 and T=27, the number of coggings for each one rotation becomes "432" which is the least common multiple of 2P=16 and T=27. Therefore, the cogging-occurring angle thereof becomes 3.33 electrical degrees (=360 electrical degrees ×8/432). The number of simultaneous coggings becomes "1" which is the greatest common demoninator of 2P=16 and T=27.

Lastly, if 2P=20, Q=3 and $\pm N=-1$ are substituted for the equations (2) and (3), the number T becomes T=27.

When T=27 as in this case, although not shown, twenty-seven teeth $16_1$–$16_{27}$ are formed on the armature. The actual angles in electrical degrees of the respective teeth $16_1$–$16_{27}$ on the basis of the tooth $16_1$ are indicated in the table 14. Since the motor of this embodiment is three-phase, the ideal angle in electrical degrees are the same as that shown in the table 2. Therefore, on the respective teeth $16_1$–$16_{27}$, divided armature windings of the respective phases are wound in the winding directions as shown in the table 10. Since the motor of this embodiment is the motor of three phases, twenty magnetic poles, and twenty-seven slots and thus 2P=20 and T=27, the number of coggings for each one rotation becomes "540" which is the least common multiple of 2P=20 and T=27. Therefore, the cogging-occurring angle thereof becomes 6.67 electrical degrees (=360 electrical degrees ×10/540). The number of simultaneous coggings becomes "1" which is the greatest common demoninator of 2P=20 and T=27.

By contrast, in the conventional motor, if the motor is three phases and twenty magnet poles, the number of teeth always becomes "30" in accordance with the equation (1). Therefore, in the conventional one, although not shown, thirty teeth $2_1$–$2_{30}$ are formed as shown in the table 15, and divided armature windings are wound thereon. In the conventional one, the number of coggings for each one rotation becomes "60" which is the least common multiple of 2P=20 and T=30. Therefore, the cogging-occurring angle thereof becomes 60 electrical degrees (=360×10/60). The number of simultaneous coggings becomes "10" which is the greatest common demoninator of 2P=20 and T=30.

Although each of the foregoing embodiments is a brushless motor in which the field magnet serves as a rotor, the present invention can be embodied as a motor in which the field magnet serves as a stator and the armature serves as a rotor. The position of the field magnet is not limited to the outside of the armature but the same can be positioned inside the inner periphery of the armature. Furthermore, the present invention can be embodied as a motor in which the armature and the field magnet are opposed to each other axially thereof with a gap formed therebetween.

Although the present invention has been described and illustrated in detail, it is clearly understood that the same is by way of illustration and example only and is not to be taken by way of limitation, the spirit and scope of the present invention being limited only by the terms of the appended claims.

TABLE 1

| Teeth No. | Angle (Electrical degrees) |
|---|---|
| $16_1$ | 0 |
| $16_2$ | 160 |
| $16_3$ | 320 |
| $16_4$ | 120 |
| $16_5$ | 280 |
| $16_6$ | 80 |
| $16_7$ | 240 |
| $16_8$ | 40 |
| $16_9$ | 200 |

TABLE 2

| Phase | Angle (Electrical degrees) |
|---|---|
| +U | 0 |
| −W | 60 |
| +V | 120 |
| −U | 180 |
| +W | 240 |
| −V | 300 |

TABLE 3

| Teeth No. | ALPHA (Electrical degrees) | DELTA (Electrical degrees) | Phase |
|---|---|---|---|
| $16_1$ | 0 | 0 | +U |
| $16_2$ | 160 | −20 | −U |
| $16_3$ | 320 | 20 | −V |
| $16_4$ | 120 | 0 | +V |
| $16_5$ | 280 | −20 | −V |
| $16_6$ | 80 | 20 | −W |
| $16_7$ | 240 | 0 | +W |
| $16_8$ | 40 | −20 | −W |
| $16_9$ | 200 | 20 | −U |

TABLE 4

| Teeth No. | ALPHA (Electrical degrees) | DELTA (Electrical degrees) | Phase |
|---|---|---|---|
| $2_1$ | 0 | 0 | +U |
| $2_2$ | 120 | 0 | +V |
| $2_3$ | 240 | 0 | +W |
| $2_4$ | 0 | 0 | +U |
| $2_5$ | 120 | 0 | +V |
| $2_6$ | 240 | 0 | +W |
| $2_7$ | 0 | 0 | +U |
| $2_8$ | 120 | 0 | +V |
| $2_9$ | 240 | 0 | +W |
| $2_{10}$ | 0 | 0 | +U |
| $2_{11}$ | 120 | 0 | +V |
| $2_{12}$ | 240 | 0 | +W |

TABLE 5

| Teeth No. | Angle (Electrical degrees) |
|---|---|
| $16_1$ | 0 |
| $16_2$ | 96 |
| $16_3$ | 192 |
| $16_4$ | 288 |
| $16_5$ | 24 |
| $16_6$ | 120 |
| $16_7$ | 216 |
| $16_8$ | 312 |
| $16_9$ | 48 |
| $16_{10}$ | 144 |
| $16_{11}$ | 240 |
| $16_{12}$ | 336 |
| $16_{13}$ | 72 |
| $16_{14}$ | 168 |
| $16_{15}$ | 264 |

TABLE 6

| Phase | Angle (Electrical degrees) |
|---|---|
| +I | 0 |
| −IV | 36 |
| +II | 72 |
| −V | 108 |
| +III | 144 |
| −I | 180 |
| +IV | 216 |
| −II | 252 |
| +V | 288 |
| −III | 324 |

TABLE 7

| Teeth No. | ALPHA (Electrical degrees) | DELTA (Electrical degrees) | Phase |
|---|---|---|---|
| $16_1$ | 0 | 0 | +I |
| $16_2$ | 96 | −12 | −V |
| $16_3$ | 192 | 12 | −I |
| $16_4$ | 288 | 0 | +V |
| $16_5$ | 24 | −12 | −IV |
| $16_6$ | 120 | 12 | −V |
| $16_7$ | 216 | 0 | +IV |
| $16_8$ | 312 | −12 | −III |
| $16_9$ | 48 | 12 | −IV |
| $16_{10}$ | 144 | 0 | +III |
| $16_{11}$ | 240 | −12 | −II |
| $16_{12}$ | 336 | 12 | −III |
| $16_{13}$ | 72 | 0 | +II |
| $16_{14}$ | 168 | −12 | −I |
| $16_{15}$ | 264 | 12 | −II |

TABLE 8

| Teeth No. | ALPHA (Electrical degrees) | DELTA (Electrical degrees) | Phase |
|---|---|---|---|
| $2_1$ | 0 | 0 | +I |

TABLE 8-continued

| Teeth No. | ALPHA (Electrical degrees) | DELTA (Electrical degrees) | Phase |
|---|---|---|---|
| $2_2$ | 72 | 0 | +II |
| $2_3$ | 144 | 0 | +III |
| $2_4$ | 216 | 0 | +IV |
| $2_5$ | 288 | 0 | +V |
| $2_6$ | 0 | 0 | +I |
| $2_7$ | 72 | 0 | +II |
| $2_8$ | 144 | 0 | +III |
| $2_9$ | 216 | 0 | +IV |
| $2_{10}$ | 288 | 0 | +V |
| $2_{11}$ | 0 | 0 | +I |
| $2_{12}$ | 72 | 0 | +II |
| $2_{13}$ | 144 | 0 | +III |
| $2_{14}$ | 216 | 0 | +IV |
| $2_{15}$ | 288 | 0 | +V |
| $2_{16}$ | 0 | 0 | +I |
| $2_{17}$ | 72 | 0 | +II |
| $2_{18}$ | 144 | 0 | +III |
| $2_{19}$ | 216 | 0 | +IV |
| $2_{20}$ | 288 | 0 | +V |

TABLE 9

| Teeth No. | ALPHA (Electrical degrees) | DELTA (Electrical degrees) | Phase |
|---|---|---|---|
| $16_1$ | 0 | 0 | +U |
| $16_2$ | 96 | −24 | +V |
| $16_3$ | 192 | 12 | −U |
| $16_4$ | 288 | −12 | −V |
| $16_5$ | 24 | 24 | +U |
| $16_6$ | 120 | 0 | +V |
| $16_7$ | 216 | −24 | +W |
| $16_8$ | 312 | 12 | −V |
| $16_9$ | 48 | −12 | −W |
| $16_{10}$ | 144 | 24 | +V |
| $16_{11}$ | 240 | 0 | +W |
| $16_{12}$ | 336 | −24 | +U |
| $16_{13}$ | 72 | 12 | −W |
| $16_{14}$ | 168 | −12 | −U |
| $16_{15}$ | 264 | 24 | +W |

TABLE 10

| Teeth No. | ALPHA (Electrical degrees) | DELTA (Electrical degrees) | Phase |
|---|---|---|---|
| $16_1$ | 0 | 0 | +U |
| $16_2$ | 137.14 | 17.14 | +V |
| $16_3$ | 274.29 | −25.71 | −V |
| $16_4$ | 51.43 | −8.57 | −W |
| $16_5$ | 188.57 | 8.57 | −U |
| $16_6$ | 325.71 | 25.71 | −V |
| $16_7$ | 102.86 | −17.14 | +V |
| $16_8$ | 240 | 0 | +W |
| $16_9$ | 17.14 | 17.14 | +U |
| $16_{10}$ | 154.29 | −25.71 | −U |
| $16_{11}$ | 291.43 | −8.57 | −V |
| $16_{12}$ | 68.57 | 8.57 | −W |
| $16_{13}$ | 205.71 | 25.71 | −U |
| $16_{14}$ | 342.86 | −17.14 | +U |
| $16_{15}$ | 120 | 0 | +V |
| $16_{16}$ | 257.14 | 17.14 | +W |
| $16_{17}$ | 34.29 | −25.71 | −W |
| $16_{18}$ | 171.43 | −8.57 | −U |
| $16_{19}$ | 308.57 | 8.57 | −V |
| $16_{20}$ | 85.71 | 25.71 | −W |
| $16_{21}$ | 222.86 | −17.14 | +W |

TABLE 11

| Teeth No. | ALPHA (Electrical degrees) | DELTA (Electrical degrees) | Phase |
|---|---|---|---|
| $2_1$ | 0 | 0 | +U |
| $2_2$ | 120 | 0 | +V |
| $2_3$ | 240 | 0 | +W |
| $2_4$ | 0 | 0 | +U |
| $2_5$ | 120 | 0 | +V |
| $2_6$ | 240 | 0 | +W |
| $2_7$ | 0 | 0 | +U |
| $2_8$ | 120 | 0 | +V |
| $2_9$ | 240 | 0 | +W |
| $2_{10}$ | 0 | 0 | +U |
| $2_{11}$ | 120 | 0 | +V |
| $2_{12}$ | 240 | 0 | +W |
| $2_{13}$ | 0 | 0 | +U |
| $2_{14}$ | 120 | 0 | +V |
| $2_{15}$ | 240 | 0 | +W |
| $2_{16}$ | 0 | 0 | +U |
| $2_{17}$ | 120 | 0 | +V |
| $2_{18}$ | 240 | 0 | +W |
| $2_{19}$ | 0 | 0 | +U |
| $2_{20}$ | 120 | 0 | +V |
| $2_{21}$ | 240 | 0 | +W |
| $2_{22}$ | 0 | 0 | +U |
| $2_{23}$ | 120 | 0 | +V |
| $2_{24}$ | 240 | 0 | +W |

TABLE 12

| Teeth No. | ALPHA (Electrical degrees) | DELTA (Electrical degrees) | Phase |
|---|---|---|---|
| $16_1$ | 0 | 0 | +U |
| $16_2$ | 160 | −20 | −U |
| $16_3$ | 320 | 20 | −V |
| $16_4$ | 120 | 0 | +V |
| $16_5$ | 280 | −20 | −V |
| $16_6$ | 80 | 20 | −W |
| $16_7$ | 240 | 0 | +W |
| $16_8$ | 40 | −20 | −W |
| $16_9$ | 200 | 20 | −U |
| $16_{10}$ | 0 | 0 | +U |
| $16_{11}$ | 160 | −20 | −U |
| $16_{12}$ | 320 | 20 | −V |
| $16_{13}$ | 120 | 0 | +V |
| $16_{14}$ | 280 | −20 | −V |
| $16_{15}$ | 80 | 20 | −W |
| $16_{16}$ | 240 | 0 | +W |
| $16_{17}$ | 40 | −20 | −W |
| $16_{18}$ | 200 | 20 | −U |

TABLE 13

| Teeth No. | ALPHA (Electrical degrees) | DELTA (Electrical degrees) | Phase |
|---|---|---|---|
| $16_1$ | 0 | 0 | +U |
| $16_2$ | 106.67 | −13.33 | +V |
| $16_3$ | 213.33 | −26.67 | +W |
| $16_4$ | 320 | 20 | −V |
| $16_5$ | 66.67 | 6.67 | −W |
| $16_6$ | 173.33 | −6.67 | −U |
| $16_7$ | 280 | −20 | −V |
| $16_8$ | 26.67 | 26.67 | +U |
| $16_9$ | 133.33 | 13.33 | +V |
| $16_{10}$ | 240 | 0 | +W |
| $16_{11}$ | 346.67 | −13.33 | +U |
| $16_{12}$ | 93.33 | −26.67 | +V |
| $16_{13}$ | 200 | 20 | −U |
| $16_{14}$ | 306.67 | 6.67 | −V |
| $16_{15}$ | 53.33 | −6.67 | −W |
| $16_{16}$ | 160 | −20 | −U |
| $16_{17}$ | 266.67 | 26.67 | +W |
| $16_{18}$ | 13.33 | 13.33 | +U |
| $16_{19}$ | 120 | 0 | +V |
| $16_{20}$ | 226.67 | −13.33 | −W |
| $16_{21}$ | 333.33 | −26.67 | +U |
| $16_{22}$ | 80 | 20 | −W |
| $16_{23}$ | 186.67 | 6.67 | −U |

TABLE 13-continued

| Teeth No. | ALPHA (Electrical degrees) | DELTA (Electrical degrees) | Phase |
|---|---|---|---|
| 16$_{24}$ | 293.33 | −6.67 | −V |
| 16$_{25}$ | 40 | −20 | −W |
| 16$_{26}$ | 146.67 | 26.67 | +V |
| 16$_{27}$ | 253.33 | 13.33 | +W |

TABLE 14

| Teeth No. | ALPHA (Electrical degrees) | DELTA (Electrical degrees) | Phase |
|---|---|---|---|
| 16$_1$ | 0 | 0 | +U |
| 16$_2$ | 133.33 | 13.33 | +V |
| 16$_3$ | 266.67 | 26.67 | +W |
| 16$_4$ | 40 | −20 | −W |
| 16$_5$ | 173.33 | −6.67 | −U |
| 16$_6$ | 306.67 | +6.67 | −V |
| 16$_7$ | 80 | 20 | −W |
| 16$_8$ | 213.33 | −26.67 | +W |
| 16$_9$ | 346.67 | −13.33 | +U |
| 16$_{10}$ | 120 | 0 | +V |
| 16$_{11}$ | 253.33 | 13.33 | +W |
| 16$_{12}$ | 26.67 | 26.67 | +U |
| 16$_{13}$ | 160 | −20 | −U |
| 16$_{14}$ | 293.33 | −6.67 | −V |
| 16$_{15}$ | 66.67 | 6.67 | −W |
| 16$_{16}$ | 200 | 20 | −U |
| 16$_{17}$ | 333.33 | −26.67 | +U |
| 16$_{18}$ | 106.67 | −13.33 | +V |
| 16$_{19}$ | 240 | 0 | +W |
| 16$_{20}$ | 13.33 | 13.33 | +U |
| 16$_{21}$ | 146.67 | 26.67 | +V |
| 16$_{22}$ | 280 | −20 | −V |
| 16$_{23}$ | 53.33 | −6.67 | −W |
| 16$_{24}$ | 186.67 | 6.67 | −U |
| 16$_{25}$ | 320 | 20 | −V |
| 16$_{26}$ | 93.33 | −26.67 | +V |
| 16$_{27}$ | 226.67 | −13.33 | +W |

TABLE 15

| Teeth No. | ALPHA (Electrical degrees) | DELTA (Electrical degrees) | Phase |
|---|---|---|---|
| 2$_1$ | 0 | 0 | +U |
| 2$_2$ | 120 | 0 | +V |
| 2$_3$ | 240 | 0 | +W |
| 2$_4$ | 0 | 0 | +U |
| 2$_5$ | 120 | 0 | +V |
| 2$_6$ | 240 | 0 | +W |
| 2$_7$ | 0 | 0 | +U |
| 2$_8$ | 120 | 0 | +V |
| 2$_9$ | 240 | 0 | +W |
| 2$_{10}$ | 0 | 0 | +U |
| 2$_{11}$ | 120 | 0 | +V |
| 2$_{12}$ | 240 | 0 | +W |
| 2$_{13}$ | 0 | 0 | +U |
| 2$_{14}$ | 120 | 0 | +V |
| 2$_{15}$ | 240 | 0 | +W |
| 2$_{16}$ | 0 | 0 | +U |
| 2$_{17}$ | 120 | 0 | +V |
| 2$_{18}$ | 240 | 0 | +W |
| 2$_{19}$ | 0 | 0 | +U |
| 2$_{20}$ | 120 | 0 | +V |
| 2$_{21}$ | 240 | 0 | +W |
| 2$_{22}$ | 0 | 0 | +U |
| 2$_{23}$ | 120 | 0 | +V |
| 2$_{24}$ | 240 | 0 | +W |
| 2$_{25}$ | 0 | 0 | +U |
| 2$_{26}$ | 120 | 0 | +V |
| 2$_{27}$ | 240 | 0 | +W |
| 2$_{28}$ | 0 | 0 | +U |
| 2$_{29}$ | 120 | 0 | +V |
| 2$_{30}$ | 240 | 0 | +W |

What is claimed is:

1. A motor, comprising:
an armature having a plurality of teeth, said teeth being arranged at equal pitch;
divided armature windings wound on respective teeth of said armature; and
a field magnet having a plurality of magnetic poles being alternately magnetized in reverse polarity, said magnetic poles being arranged at equal pitch, and;
the number of said teeth being determined in accordance with the equation $T=(P\pm N)Q$ (where $0<N<P-2P/Q$) when the number of said magnetic poles of said field magnets is "2P" and the number of phases of said divided armature windings is "Q".

2. A motor in accordance with claim 1, wherein at least one of said plurality of teeth has an actual angle in electrical degrees which is different from an ideal angle in electrical degrees of divided armature windings wound thereon, said divided armature windings of the same phase as said divided armature windings of the ideal angle in electrical degrees being wound on said at least one of said plurality of teeth.

3. A motor in accordance with claim 2, wherein said winding direction of said divided armature winding of said ideal angle in electrical degrees is predetermined, and on said at least one of said plurality of teeth, said divided armature winding being wound in the same direction of said divided armature winding of said ideal angle in electrical degrees.

4. A method for winding divided armature windings in a motor which comprises an armature having a plurality of teeth, said teeth being arranged at equal pitch; said divided armature windings being wound on respective teeth of said armature; and a field magnet having a plurality of magnetic poles alternately magnetized in reverse polarity, said magnetic poles being arranged at equal pitch, comprises the steps of:

(a) determining the number T of said teeth in accordance with the equation $T=(P\pm N)Q$ (where $0<N<P-2P/Q$) when the number of said magnetic poles of said field magnet is "2P" and a number of phases of said divided armature windings is "Q"; and (b) determining phases of respective one of said divided armature windings to be wound on a respective one of said plurality of teeth.

5. A method in accordance with claim 4, wherein said step (b) includes the steps (b-i) of evaluating ideal angles in electrical degrees of respective divided armature windings, (b-ii) of evaluating actual angles in electrical degrees of the respective teeth, and (b-iii) of determining the phases of said divided armature windings to be wound on the respective teeth as the same phases closest to said divided armature windings of said ideal angles in electrical degrees.

6. A method in accordance with claim 5, wherein said step (b) further includes a step (b-iv) of determining winding directions of said divided armature windings to be wound on the respective teeth.

7. A method in accordance with claim 6, wherein said step (b-iv) includes steps of evaluating winding directions of divided armature windings of said ideal angles in electrical degrees, and determining winding directions as the same winding directions of the same phases closest to said divided armature windings of said ideal angles in electrical degrees.

* * * * *